(12) United States Patent
Chung

(10) Patent No.: US 8,555,143 B2
(45) Date of Patent: Oct. 8, 2013

(54) FLASH MEMORY CONTROLLER AND THE METHOD THEREOF

(75) Inventor: Shen Ming Chung, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 618 days.

(21) Appl. No.: 12/876,644

(22) Filed: Sep. 7, 2010

(65) Prior Publication Data

US 2010/0332952 A1 Dec. 30, 2010

Related U.S. Application Data

(63) Continuation-in-part of application No. 12/341,452, filed on Dec. 22, 2008, now Pat. No. 8,473,815.

(51) Int. Cl.
*G06F 11/10* (2006.01)
*H03M 13/35* (2006.01)

(52) U.S. Cl.
USPC ............................................ 714/773; 714/774

(58) Field of Classification Search
USPC .................................................. 714/773, 774
See application file for complete search history.

(56) References Cited

U.S. PATENT DOCUMENTS

| | | | |
|---|---|---|---|
| 5,438,573 A * | 8/1995 | Mangan et al. ............... | 714/711 |
| 8,136,015 B2 * | 3/2012 | Kawai et al. ................... | 714/763 |
| 2003/0037299 A1 | 2/2003 | Smith | |
| 2007/0028030 A1 * | 2/2007 | Mahrla et al. ................. | 711/100 |
| 2007/0226592 A1 | 9/2007 | Radke | |
| 2007/0266291 A1 | 11/2007 | Toda et al. | |
| 2008/0072120 A1 | 3/2008 | Radke | |
| 2008/0168319 A1 | 7/2008 | Lee et al. | |
| 2009/0019321 A1 | 1/2009 | Radke | |
| 2009/0055706 A1 | 2/2009 | Lin | |
| 2009/0125726 A1 | 5/2009 | Iyer et al. | |
| 2010/0011247 A1 | 1/2010 | Shrader et al. | |
| 2010/0011276 A1 | 1/2010 | Chen et al. | |
| 2010/0100763 A1 | 4/2010 | Chen | |

OTHER PUBLICATIONS

Te-Hsuan Chen et al., An Adaptive-Rate Error Correction Scheme for NAND Flash Memory, IEEE VLSI Test Symposium, 2009, pp. 53-58.
Rino Micheloni et al., Non-Volatile Memories for Removable Media, Proceedings of the IEEE, Jan. 2009, pp. 148-160, vol. 97, No. 1.
Song-Chul Jang et al., Design of a Parallel BCH Decoder for MLC Memory, 2008 International SoC Design Conference, 2008, pp. III-46-III-47.
Office Action issued Apr. 17, 2013 by TIPO for the counterpart TIPO Patent Application No. 098111610 which cites US20070226592.

* cited by examiner

*Primary Examiner* — Stephen M Baker
(74) *Attorney, Agent, or Firm* — WPAT, P.C.; Anthony King

(57) ABSTRACT

A flash memory controller comprises a flash memory interface controller, a host interface controller, a random-access memory (RAM) interface controller, an ECC encoder, an ECC divider, an ECC constructor and an ECC decoder. The ECC encoder is configured to receive a write information datum from the host interface controller and generate an ECC datum. The ECC divider is configured to divide the generated ECC datum into a plurality of ECC segments. The ECC constructor is configured to receive a plurality of ECC segments from the flash memory interface controller and construct an ECC datum. The ECC decoder is configured to correct errors of a read information datum based on a read information datum and the constructed ECC datum and forward the corrected read information datum to the host interface controller when operated in a read mode.

28 Claims, 5 Drawing Sheets

FLASH MEMORY CONTROLLER AND THE METHOD THEREOF

CROSS-REFERENCE TO A RELATED APPLICATION

This application is a Continuation-In-Part (CIP) Application of U.S. patent application Ser. No. 12/341,452 filed on Dec. 22, 2008, the disclosure of which is incorporate herein by reference.

DESCRIPTION

1. Technical Field

The disclosure relates to a flash memory, and more particularly, to methods and systems of error correction code (ECC) for a flash memory.

2. Background

Due to increasing capacities, flash memories have become an alternative to the traditional motor-driven disks in many applications, such as portable devices. Since flash memories contain no mechanical parts, they exhibit advantages such as shock resistance, low power consumption and high speed compared to motor-driven disks. However, flash memories have their own limitations. One limitation is that each read/write unit of a flash memory should be erased before writing. Another limitation is that each read/write unit of a flash memory has a limited life of erase-write cycles, and exceeding the limit of erase-write cycles may cause unpredictable defective bits to spread throughout the flash memory.

Traditionally, a flash memory can utilize techniques such as the ECC, Wear-Leveling Algorithm (WLA) and Bad Block Management (BBM) to reduce the performance degradation caused by the above limitations and thus lengthen the lifetime of the flash memory. To utilize the ECC, WLA and BBM techniques, each flash page, which is the smallest read/write unit of a flash memory, should comprise a data area and a spare area, wherein the data area stores the user data and the spare area stores the management data including the information required by ECC, WLA and BBM techniques.

However, a flash memory can only erase one flash block at a time. Furthermore, a flash block usually contains 32 or more flash pages. Therefore, once the number of defective bits exceeds the correction capability of a flash page, the whole flash block is usually marked as a defective block by the BBM technique. If marked as a defective block, all the flash pages of the flash block will not be accessed for future read/write operations, which is a waste of memory space, since many flash pages in the same flash block are still within the capacities of the ECC technique and therefore usable.

One of the conventional methods introduces an apparatus and a method to lengthen the lifetime of a flash memory such that the length of the ECC code can be lengthened according to requirement. After the generation of the ECC code, the user data is stored in the data area of a flash page, and the ECC code may be divided into a plurality of segments and then stored into the spare areas of a plurality of flash pages. The apparatus and a method provided by this conventional method are preferable to a flash memory of which the spare area of a flash page can be partitioned. However, for those flash memories of which the spare area of a flash page cannot be partitioned, a more convenient apparatus and the method thereof are preferable.

Accordingly, there is a need to design an apparatus and the method thereof, which are suitable to those flash memories of which the spare area of a flash page cannot be partitioned, to lengthen the lifetime of a flash memory.

SUMMARY

Some exemplary embodiments provide dynamic methods by sharing the spare areas in each flash block. That is, each information datum stored in a flash block of a flash memory may have an ECC datum with variable length, which results in a variable ECC capability based on the characteristic of each flash page. The variable ECC capability increases lifetime of the flash memory.

One embodiment discloses a flash memory controller comprising a flash memory interface controller, a host interface controller, a random-access memory (RAM) interface controller, an ECC encoder, an ECC divider, an ECC constructor and an ECC decoder. The flash memory interface controller is configured to store information data, ECC segments, and linked-lists to a flash memory and read information data, ECC segments, and the linked-lists from the flash memory. The host interface controller is configured to forward information data to a host and to receive information data from the host. The RAM interface controller is configured to store the linked-lists to a RAM device and read the linked-lists from the RAM device. The ECC encoder is configured to receive a write information datum from the host interface controller and generate an ECC datum, of which the length is variable, in response to the write information datum to be stored in the flash memory when operated in a write mode. The ECC divider is configured to divide the generated ECC datum into a plurality of ECC segments according to the length of the generated ECC datum and forward the divided ECC segments to the flash memory interface controller when operated in a write mode. The ECC constructor is configured to receive a plurality of ECC segments from the flash memory interface controller and construct an ECC datum by combining the received ECC segments for a read information datum received from the flash memory when operated in a read mode. The ECC decoder is configured to correct errors of the read information datum based on the read information datum and the constructed ECC datum and forward the corrected read information datum to the host interface controller when operated in a read mode. In addition, the link relations of the ECC segments in the flash memory are indicated by the linked-lists.

Another embodiment discloses a method for writing information data along with corresponding ECC data into a flash memory, the method comprising the steps of: reading a linked-list from at least a spare area of at least an extended page from a flash memory, wherein an extended page is a combination of a plurality of flash pages; generating an ECC datum in response to an information datum to be stored in a flash memory, wherein the length of the ECC datum is determined by the linked-list; dividing the ECC datum into a plurality of ECC segments according to the length of the ECC datum; storing the information datum to an extended data area of an extended page of the flash memory; and storing the ECC segments to a plurality of spare areas of at least an extended page of the flash memory according to the linked-list.

Another embodiment discloses a method of reading information data along with corresponding ECC data from a flash memory, the method comprising the steps of: reading a linked-list from at least a spare area of at least an extended page, which is a combination of a plurality of flash pages, from a flash memory; reading an information datum from an extended data area of an extended page from the flash memory; reading a plurality of ECC segments from a plurality of spare areas of at least an extended page of the flash memory according to the linked-list; combining the plurality of ECC segments into an ECC datum; and correcting the information datum according to the information datum and the ECC datum.

BRIEF DESCRIPTION OF THE DRAWINGS

The accompanying drawings, which are incorporated in and constitute a part of this specification, illustrate embodiments of the disclosure and, together with the description, serve to explain the principles of the invention.

DETAILED DESCRIPTION

Embodiments of this disclosure will now be described more fully with reference to the accompanying drawings. This disclosure may, however, comprise embodiments of many different forms and should not be construed as limited to the embodiments set forth herein. Rather, these embodiments are provided so that this disclosure will be thorough and complete, and will fully convey the scope of this disclosure to those skilled in the art.

Figure 1:
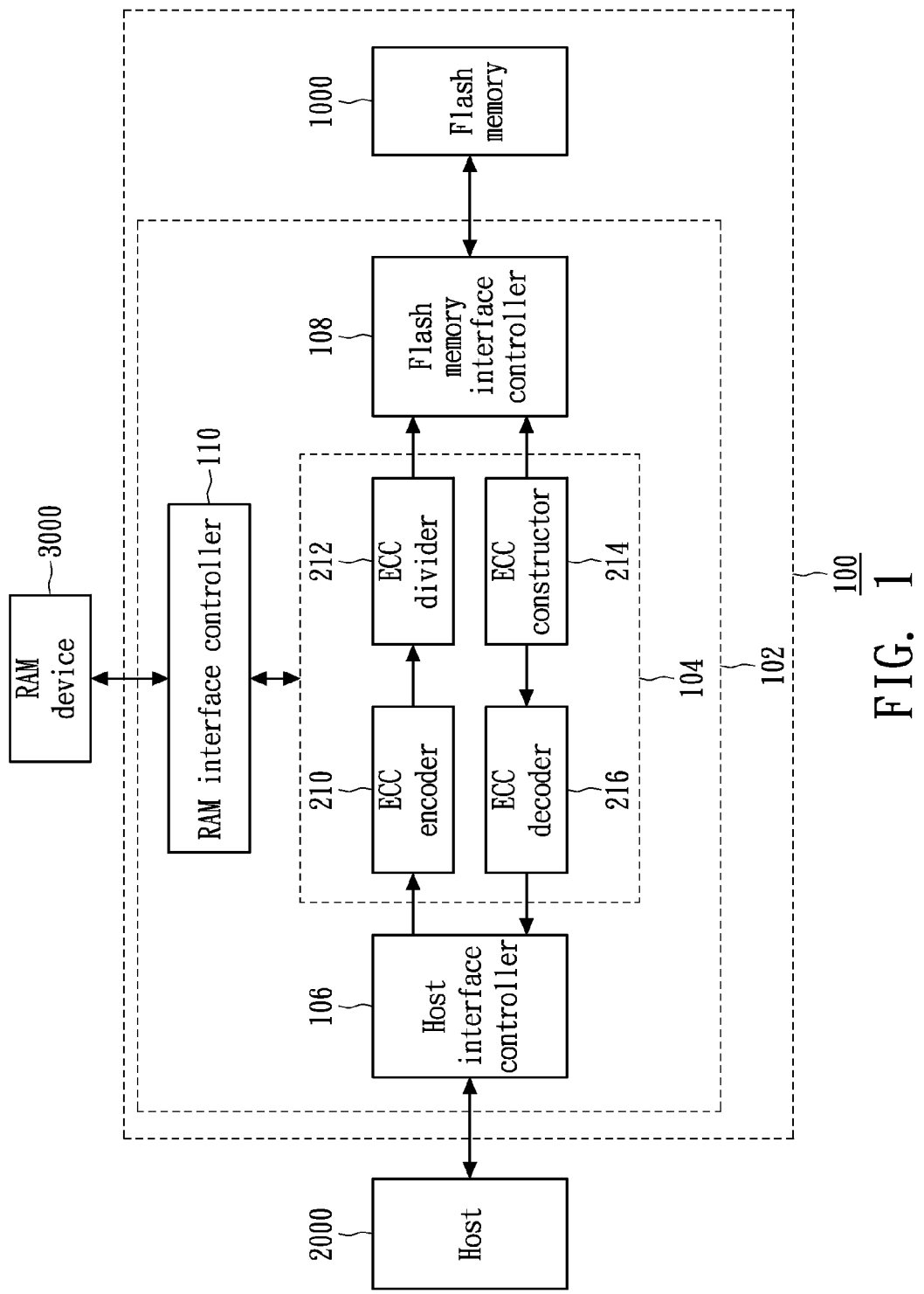
FIG. 1 illustrates the block diagram of a flash memory controller in accordance with an exemplary embodiment.

FIG. 1 illustrates the block diagram of a flash memory controller in accordance with an exemplary embodiment. The flash memory system 100 comprises a flash memory controller 102 and a flash memory 1000. The flash memory controller 102 comprises an ECC controller 104, a host interface controller 106, a flash memory interface controller 108 and a RAM interface controller 110. The host interface controller 106 transacts data with a host 2000. The flash memory interface controller 108 transacts data with the flash memory 1000. The RAM interface controller 110 transacts data with a RAM device 3000. The ECC controller 104 comprises an ECC encoder 210, an ECC divider 212, an ECC constructor 214 and an ECC decoder 216.

The ECC encoder 210 is configured to receive a write information datum from the host interface controller 106 and generate an ECC datum, of which the length is variable, in response to the write information datum to be stored in the flash memory 1000 when operated in a write mode. The ECC divider 212 is configured to divide the generated ECC datum into a plurality of ECC segments according to the length of the generated ECC datum and forward the divided ECC segments to the flash memory interface controller 108 when operated in a write mode. The ECC constructor 214 is configured to receive a plurality of ECC segments from the flash memory interface controller 108 and construct an ECC datum by combining the received ECC segments for a read information datum received from the flash memory 1000 when operated in a read mode. The ECC decoder 216 is configured to correct errors of the read information datum based on the read information datum and the constructed ECC datum and forward the corrected read information datum to the host interface controller 106 when operated in a read mode.

Figure 2:
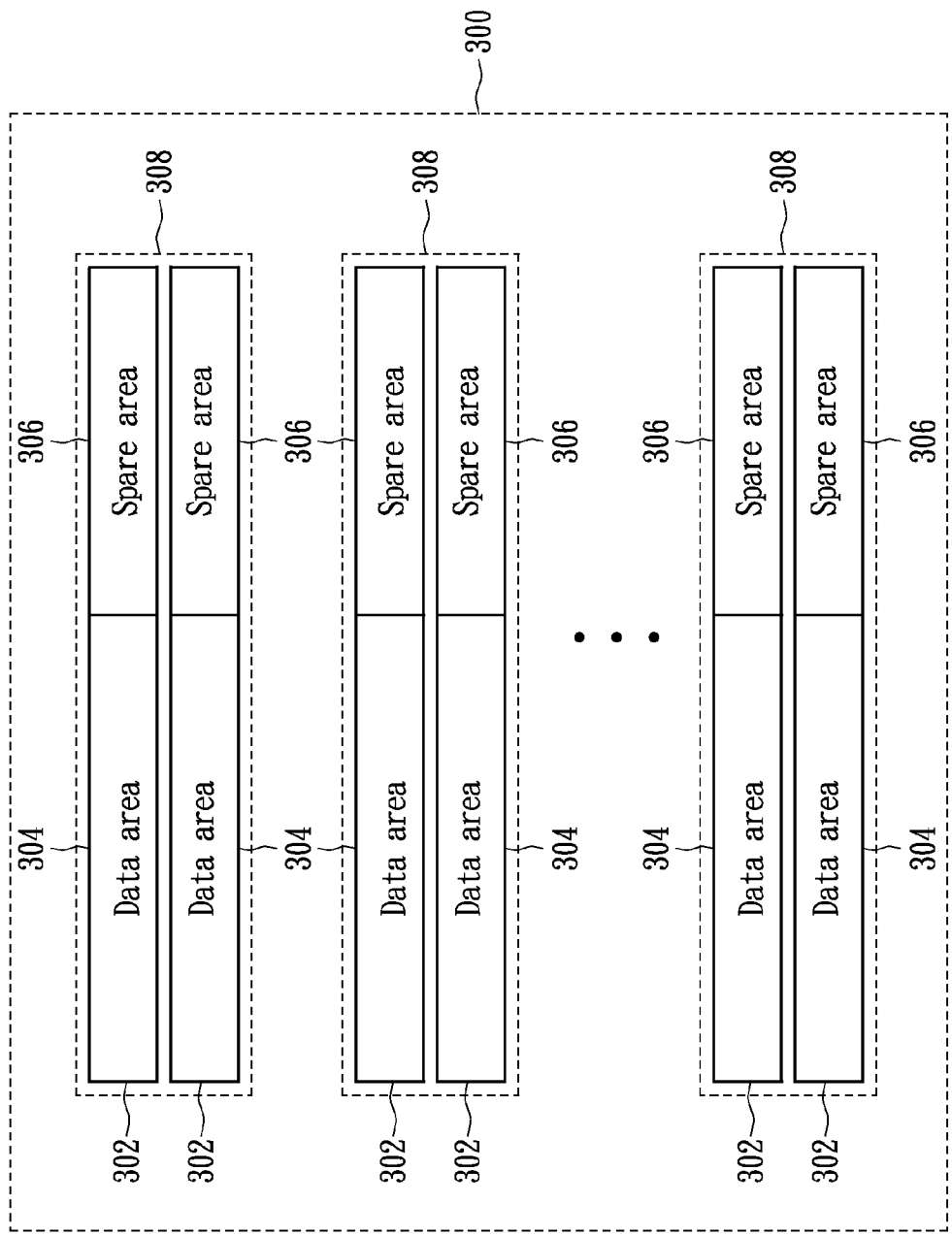
FIG. 2 shows a block diagram of the flash configuration of a flash block in accordance with an exemplary embodiment.

FIG. 2 shows a block diagram of the flash configuration of a flash block in accordance with an exemplary embodiment. As shown in FIG. 2, the flash block 300 comprises a plurality of flash pages 302, wherein each flash page 302 comprises a data area 304 for storing user data and a spare area 306 for storing the management data. A plurality of extended pages 308 are formed by combining a plurality of flash pages 302. Preferably, as shown in FIG. 2, each extended page 308 is a combination of two adjacent flash pages 302.

Taking a flash memory with each flash page comprising a 512-byte data area and a 16-byte spare area as an example, each of the extended pages 308 shown in FIG. 2 has an extended data area of 1024 bytes, composed of two data area 302, and two spare areas, each containing 16 bytes. The first spare area is denoted as a native spare area, storing an ECC segment of an ECC datum and management data corresponding to the information data stored in the 1024-byte extended data area. Preferably, 13 bytes of the native spare area are used to store the ECC segment, and 3 bytes of the native spare area are used to store the management data. The second spare area is denoted as a shared spare area. Most of the shared spare areas are used to form a sharing pool, wherein each shared spare area in the sharing pool is used to store an ECC segment of an ECC datum, which may correspond to any extended page 308 in the flash block 300. Some shared spare areas form a pointer space storing a plurality of linked-lists, which store the link relation of all of the ECC segments. Some shared spare areas form a pointer parity space, storing an ECC parity for the pointer space.

In an exemplary embodiment, a flash block of a flash memory may contain p flash pages. Accordingly, these p flash pages form p/2 extended pages, including p/2 native spare areas and p/2 shared spare areas. Each native spare area and shared spare area uses one-byte pointer for linking For a flash memory with each spare area comprising 16-byte, the pointer space is required to be formed from p/16 shared spare. If q shared spare areas are used to form the pointer parity space, there are (p/2−p/16−q) shared spare areas remaining to form the sharing pool. For instance, if p equals 128, i.e. the flash block contains 128 flash pages, there will be 64 extended pages, including 64 native spare areas and 64 shared spare areas. Among these 64 shared spare areas, eight shared spare areas are used to form the pointer space. If four shared spare areas are used to form the pointer parity space, there will be 52 shared spare areas left to form the sharing pool.

Figure 3:
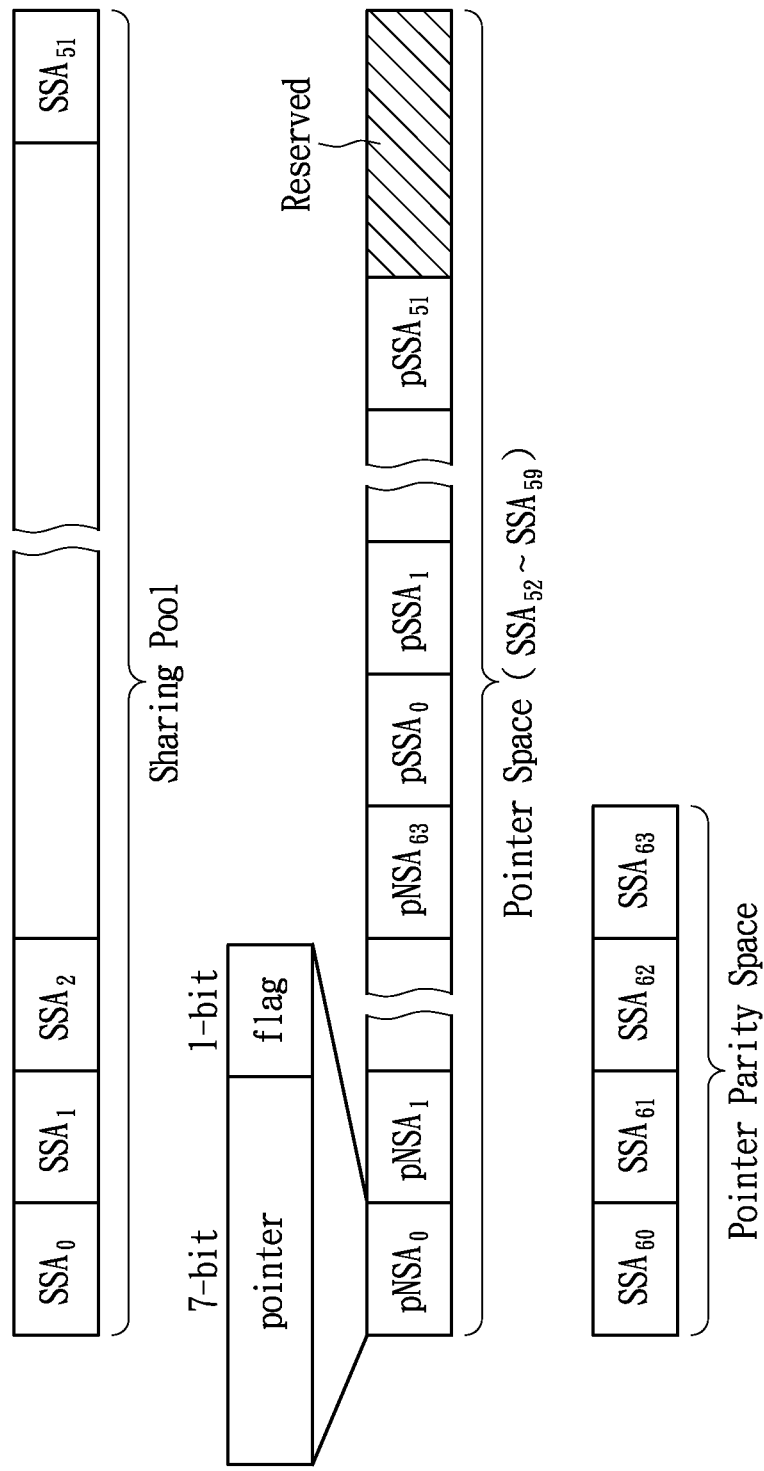
FIG. 3 shows the format of the shared spare areas in accordance with an exemplary embodiment.

FIG. 3 shows the format of the shared spare areas in accordance with an exemplary embodiment. Following the aforementioned example, a total of 52 shared spare areas (SSA) are used to form the sharing pool, wherein each shared spare area in the sharing pool can store a 16-byte ECC segment. There are total of eight shared spare areas, constituting a 128-byte space, to form the pointer space, wherein 64 bytes for $pNSA_0 \sim pNSA_{63}$ are used to record the link information of the 64 native spare areas and 52 bytes for $pSSA0 \sim pSSA_{51}$ are used to record the link information on of the 52 shared spare areas in the sharing pool. As shown in FIG. 3, seven bits of pNSA and seven bits of pSSA are used to store a pointer which indicates the store location of the next ECC segment following the present one. The remaining bit is used to store a flag, indicating whether the present ECC segment is the last one. The 12 remaining bytes of the pointer space are reserved and its usage is not the concern of this invention. In addition, there are a total of four shared spare areas, constituting a 64-byte space, to form the pointer parity space, wherein an ECC datum calculated from the pointer space will be stored for correcting errors in the pointer space.

Figure 4:
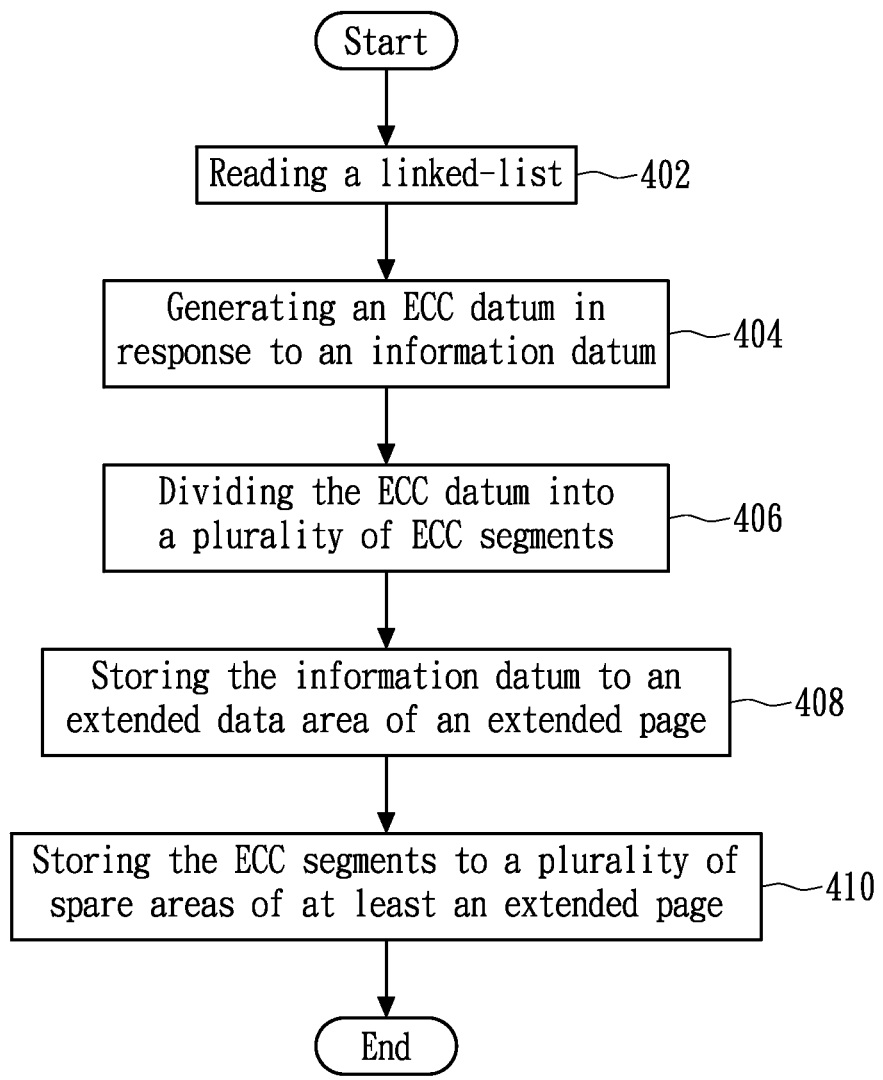
FIG. 4 is a flowchart illustrating an exemplary embodiment of the method for writing information data along with corresponding encoding ECC data into a flash memory.

FIG. 4 is a flowchart illustrating an exemplary embodiment of the method for writing information data along with corresponding encoding ECC data into a flash memory. In step 402, a linked-list is read from at least a spare area of at least an extended page, and step 404 is executed. In step 404, an ECC datum is generated in response to an information datum to be stored in a flash memory, wherein the length of the ECC datum is determined by the linked-list, and step 406 is executed. In step 406, the ECC datum is divided into a plurality of ECC segments according to the length of the ECC datum, and step 408 is executed. In step 408, the information datum is stored to the extended data area of an extended page of the flash memory, and step 410 is executed. In step 410, the ECC segments are stored to a plurality of spare areas of at least an extended page of the flash memory according to the linked-list.

The following illustrates applying the method for writing information data along with corresponding encoding ECC data into a flash memory shown in FIG. 4 to the flash memory controller shown in FIG. 1 and the flash block shown in FIG. 2. In step 402, a linked-list is read from the pointer space of the flash block 300. In this exemplary embodiment, the linked-list is corrected based on the data stored in pointer space and the ECC datum stored in the pointer parity space of the flash block 300. Accordingly, the ECC decoder 216 can be used to correct the linked-list according to the linked-list and the ECC datum for the linked-list. For many flash memories, an erase operation is required before a write operation is performed. Therefore, the linked-list read from the flash block 300 is preferably stored in a RAM device, such as the RAM device 3000. In step 404, by checking the linked-list, the length of the ECC datum corresponding to the data area 304 used to store an information datum is obtained, and the link relation of the ECC segments, i.e. the store information of the shared spare areas 306 storing the ECC segments, is also obtained. Next, an ECC datum, whose length is according to the linked-list, is generated by the ECC encoder 210 in response to the information datum to be stored in the flash block 300. In step 406, the ECC datum is divided by the ECC divider 212 into a plurality of ECC segments according to the length of the ECC datum. In step 408, the information datum is stored to an extended data area, which is the combination of the data areas 304, of an extended page 308 of the flash block 300. In step 410, the ECC segments are stored to a plurality of spare areas 306 according to the linked-list. In addition, if the original linked-list stored in the flash block 300 has been erased in case of that the flash block 300 is erased, the linked-list is retrieved from the RAM device 3000 and stored to the pointer space of the flash block 300.

Figure 5:
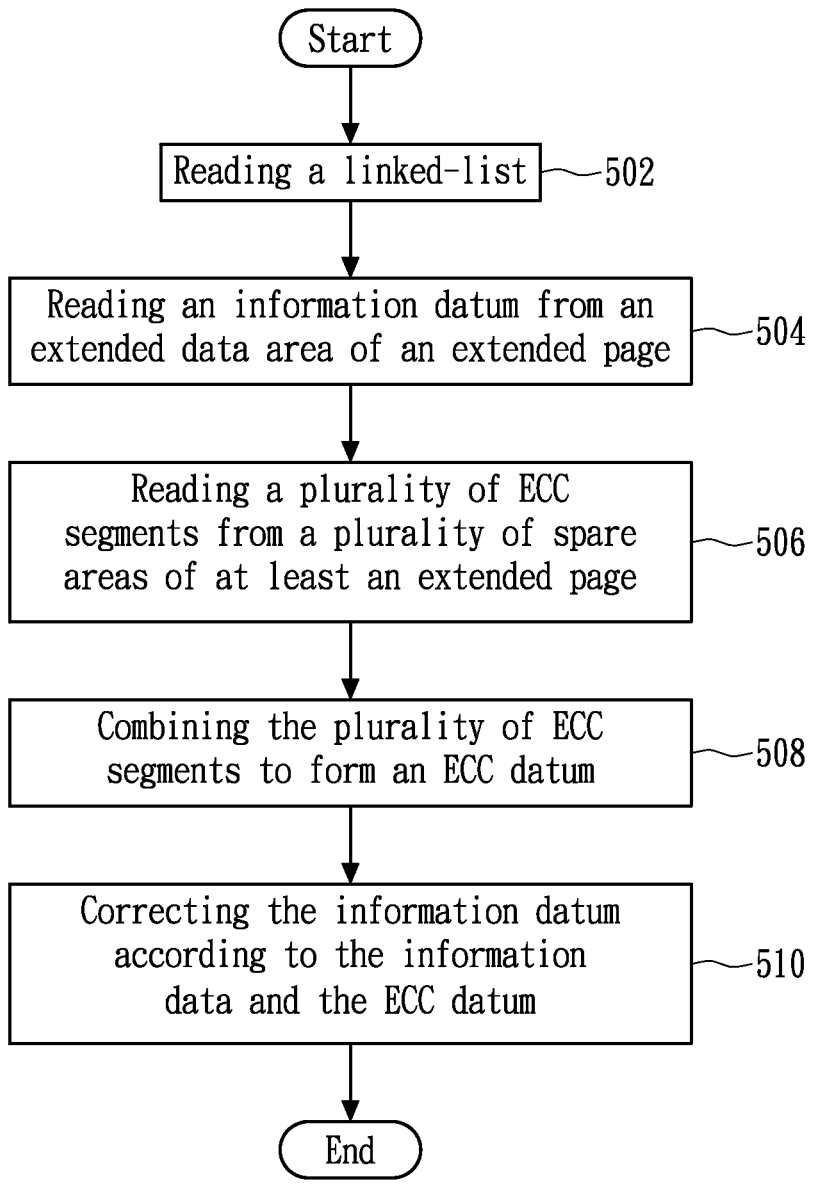
FIG. 5 is a flowchart illustrating an exemplary embodiment of the method for reading information data along with corresponding ECC data from a flash memory.

FIG. 5 is a flowchart illustrating an exemplary embodiment of the method for reading information data along with corresponding ECC data from a flash memory. In step 502, a linked-list from at least a spare area of at least an extended page is read from a flash memory, wherein an extended page is a combination of a plurality of flash pages, and step 504 is executed. In step 504, an information datum is read from an extended data area of an extended page from the flash memory, and step 506 is executed. In step 506, a plurality of ECC segments are read from a plurality of spare areas of at least an extended page of the flash memory according to the linked-list, and step 508 is executed. In step 508, the plurality of ECC segments are combined to form an ECC datum, and step 510 is executed. In step 510, the information datum is corrected according to the information data and the ECC datum.

The following illustrates applying the method for reading information data along with corresponding ECC data from a flash memory shown in FIG. 5 to the flash memory controller shown in FIG. 1 and the flash block shown in FIG. 2. In step 502, a linked-list is read from the pointer space of the flash block 300. In this exemplary embodiment, the linked-list is corrected based on the data stored in pointer space and the ECC datum stored in the pointer parity space of the flash block 300. Accordingly, the ECC decoder 216 can be used to correct the linked-list according to the linked-list and the ECC datum for the linked-list. Similar to the previous exemplary embodiment, the linked-list read from the flash block 300 is preferably stored in a RAM device, such as the RAM device 3000. In step 504, an information datum is read from an extended data area, which is the combination of the data areas 304, of an extended page 308 from the flash block 300. In step 506, by checking the linked-list, the link relation of the ECC segments, i.e. the store information of the shared spare areas 306 storing the ECC segments, is obtained. Accordingly, a plurality of ECC segments are read from a plurality of spare areas 306 of at least an extended page 308 of the flash block 300 according to the linked-list. In step 508, the plurality of ECC segments are combined by the ECC constructor 214 to form an ECC datum. In step 510, the information datum is corrected by the ECC decoder 216 according to the information datum and the combined ECC datum. In addition, if the quantity of errors of the information datum corrected surpasses a threshold value, the length of the ECC datum is lengthened by appending the corresponding linked-list to record the change. In case that the flash block 300 is erased, the appended linked-list is stored to the pointer space of the flash block 300, and the ECC datum for the linked-list is stored to the pointer parity space of the flash block 300.

In conclusion, for a defect-vulnerable flash page, the ECC capability is increased by generating longer ECC data for information data. Since there is a limit of the size of the spare area each flash page can contain, each generated ECC datum can be divided into a plurality of ECC segments and can then be stored in the spare areas of a plurality of flash pages. In this way, the flash page with lower defect vulnerability can share a portion of its spare area with the flash pages with higher defect vulnerability. Therefore, even though the defect vulnerability of each flash page in a flash block remains the same, effectively, the defect vulnerability of all of the flash pages within a flash block is balanced, and the time at which the flash block will be marked as defective is postponed.

Further, the flash memory controller and the methods thereof can be applied to the flash memories of which the spare areas of their flash page cannot be partitioned. To these flash memories, by combining a plurality of flash pages into an extended flash page, a similar function of partitioning a spare area of a flash page is obtained, thereby enabling the aforementioned concept of spare area sharing.

The above-described exemplary embodiments are intended to be illustrative only. Those skilled in the art may devise numerous alternative embodiments without departing from the scope of the following claims.

What is claimed is:
1. A flash memory controller, comprising:
a flash memory interface controller, configured to store information data, error correction code (ECC) segments, and linked-lists to a flash memory and read information data, ECC segments, and the linked-lists from the flash memory;
a host interface controller, configured to forward information data to a host and to receive information data from the host;

a random-access memory (RAM) interface controller, configured to store the linked-lists to a RAM device and read the linked-lists from the RAM device;

an ECC encoder, configured to receive a write information datum from the host interface controller and generate an ECC datum, of which the length is variable, in response to the write information datum to be stored in the flash memory when operated in a write mode;

an ECC divider, configured to divide the generated ECC datum into a plurality of ECC segments according to the length of the generated ECC datum and forward the divided ECC segments to the flash memory interface controller when operated in a write mode;

an ECC constructor configured to receive a plurality of ECC segments from the flash memory interface controller and construct an ECC datum by combining the received ECC segments for a read information datum received from the flash memory when operated in a read mode; and an ECC decoder configured to correct errors of the read information datum based on the read information datum and the constructed ECC datum and forward the corrected read information datum to the host interface controller when operated in a read mode;

wherein the link relation of the ECC segments in the flash memory is indicated by the linked-lists.

2. The flash memory controller of claim 1, wherein the each of the linked-lists indicates the link relation of all of the ECC segments of an ECC datum.

3. The flash memory controller of claim 1, wherein the length of an ECC datum is extended by extending one of the linked-lists when the quantity of errors of the corresponding information datum corrected by the ECC decoder surpasses a threshold value.

4. The flash memory controller of claim 1, wherein each flash page comprises a 512-byte data area and a 16-byte spare area.

5. The flash memory controller of claim 1, wherein the RAM interface controller is further configured to store an ECC datum of the linked-lists to the RAM device and read the ECC datum of the linked-lists from the RAM device.

6. The flash memory controller of claim 5, wherein the ECC encoder is further configured to generate an ECC datum for the linked-lists after the one of the linked-list is extended.

7. The flash memory controller of claim 5, wherein the ECC decoder is further configured to correct the linked-lists according to the linked-lists and a corresponding ECC datum when one of the linked-list is read from the RAM device.

8. The flash memory controller of claim 1, wherein each of the information data is stored in an extended data area of an extended page, which is a combination of a plurality of flash pages.

9. The flash memory controller of claim 8, wherein the extended page is a combination of two adjacent flash pages.

10. The flash memory controller of claim 8, wherein the linked-lists are stored in the spare areas of extended pages.

11. The flash memory controller of claim 8, wherein one of the ECC segments from the generated ECC datum is stored in one of the spare areas of the extended page storing the information datum to which the generated ECC datum is generated accordingly.

12. The flash memory controller of claim 11, wherein each of the remaining ECC segments divided from the generated ECC datum is stored in one of the spare areas of another extended page different from the extended page storing the information datum to which the generated ECC datum is generated accordingly.

13. A method for writing information data along with corresponding error correction code (ECC) data into a flash memory, comprising the steps of:

reading a linked-list from at least a spare area of at least an extended page from a flash memory, wherein an extended page is a combination of a plurality of flash pages;

generating an ECC datum in response to an information datum to be stored in a flash memory, wherein the length of the ECC datum is determined by the linked-list;

dividing the ECC datum into a plurality of ECC segments according to the length of the ECC datum;

storing the information datum to an extended data area of an extended page of the flash memory; and storing the ECC segments to a plurality of spare areas of at least an extended page of the flash memory according to the linked-list.

14. The method of claim 13, further comprising the steps of:

storing the linked-list into a random-access memory (RAM) device;

retrieving the linked-list from the RAM device and storing it to at least a spare area of at least an extended page if the original linked-list stored in the flash memory is erased.

15. The method of claim 13, wherein the extended page is a combination of two adjacent flash pages.

16. The method of claim 13, wherein the linked-list indicates the link relation of the ECC segments.

17. The method of claim 13, further comprising a step of:

reading an ECC datum of the linked-list from at least a spare area of at least an extended page; and correcting the linked-list according to the linked-list and the ECC datum of the linked-list.

18. The method of claim 13, wherein each flash page comprises a 512-byte data area and a 16-byte spare area.

19. The method of claim 13, wherein one of the ECC segments is stored in one of the spare areas of the extended page storing the information datum.

20. The method of claim 19, wherein each of the remaining ECC segments is stored in one of the spare areas of another extended page different from the extended page storing the information datum.

21. A method for reading information data along with corresponding error correction code (ECC) data from a flash memory, comprising the steps of:

reading a linked-list from at least a spare area of at least an extended page, which is a combination of a plurality of flash pages, from a flash memory;

reading an information datum from an extended data area of an extended page from the flash memory;

reading a plurality of ECC segments from a plurality of spare areas of at least an extended page of the flash memory according to the linked-list;

combining the plurality of ECC segments into an ECC datum; and correcting the information datum according to the information datum and the ECC datum.

22. The method of claim 21, further comprising the steps of:

storing the linked-list into a random-access memory (RAM) device;

extending the linked-list if the quantity of errors of the information datum corrected surpasses a threshold value; and storing the linked-list to at least a spare area of at least an extended page after the linked-list is extended.

23. The method of claim 21, wherein the extended page is a combination of two adjacent flash pages.

24. The method of claim 21, wherein the linked-list indicates the link relation of the ECC segments.

25. The method of claim 21, further comprising a step of:
- reading an ECC datum of the linked-list from at least a spare area of at least an extended page;
- correcting the linked-list according to the linked-list and the ECC datum of the linked-list;
- re-generating the ECC datum of the linked-list if the linked-list is extended; and
- storing the re-generated ECC datum of the linked-list into at least a spare area of at least an extended page.

26. The method of claim 21, wherein each flash page comprises a 512-byte data area and a 16-byte spare area.

27. The method of claim 21, wherein one of the ECC segments is stored in one of the spare areas of the extended page storing the information datum.

28. The method of claim 27, wherein each of the remaining ECC segments is stored in one of the spare areas of another extended page different from the extended page storing the information datum.

* * * * *